(12) United States Patent
Kovsh et al.

(10) Patent No.: US 8,401,391 B2
(45) Date of Patent: Mar. 19, 2013

(54) CHANNEL POWER MANAGEMENT IN A BRANCHED OPTICAL COMMUNICATION SYSTEM

(75) Inventors: Dmitriy Kovsh, Hoboken, NJ (US); Haifeng Li, Morganville, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 569 days.

(21) Appl. No.: 12/633,000

(22) Filed: Dec. 8, 2009

(65) Prior Publication Data

US 2011/0135310 A1 Jun. 9, 2011

(51) Int. Cl.
*H04J 14/02* (2006.01)

(52) U.S. Cl. ............... 398/83; 398/79; 398/82; 398/85; 398/84

(58) Field of Classification Search ............ 398/79, 398/82–85
See application file for complete search history.

(56) References Cited

U.S. PATENT DOCUMENTS

| | | | |
|---|---|---|---|
| 5,130,837 A | | 7/1992 | Kitamura et al. |
| 5,526,157 A * | | 6/1996 | Kawano ................. 398/1 |
| 6,115,516 A | | 9/2000 | Watson et al. |
| 6,208,441 B1 * | | 3/2001 | Jones et al. .............. 398/87 |
| 6,304,351 B1 | | 10/2001 | Pedersen |
| 6,535,309 B1 * | | 3/2003 | Terahara ................. 398/79 |
| 6,661,946 B2 * | | 12/2003 | Caroli et al. ............. 385/24 |
| 6,721,509 B2 | | 4/2004 | Xiao et al. |
| 6,904,241 B2 | | 6/2005 | DeGrange, Jr. et al. |
| 6,907,158 B2 | | 6/2005 | Vohra et al. |
| 6,907,159 B1 * | | 6/2005 | Daniel ................... 385/24 |
| 7,061,664 B2 * | | 6/2006 | Aso et al. ................ 359/332 |
| 7,650,075 B2 * | | 1/2010 | Kikuchi ................. 398/83 |
| 7,734,174 B2 * | | 6/2010 | Beckett et al. .......... 398/32 |
| 7,813,642 B2 * | | 10/2010 | Muro et al. ............. 398/83 |
| 7,817,917 B1 * | | 10/2010 | Shimamoto et al. ...... 398/37 |
| 2003/0099475 A1 * | | 5/2003 | Nemoto et al. .......... 398/83 |
| 2004/0175179 A1 * | | 9/2004 | Xiao et al. .............. 398/83 |
| 2005/0213980 A1 * | | 9/2005 | Ota .................... 398/84 |
| 2006/0018658 A1 * | | 1/2006 | Mori .................. 398/79 |
| 2008/0080865 A1 * | | 4/2008 | Muro et al. ............. 398/83 |
| 2008/0267631 A1 | | 10/2008 | Collings et al. |
| 2009/0028567 A1 * | | 1/2009 | Socci et al. ............. 398/85 |
| 2009/0226172 A1 * | | 9/2009 | Larikova et al. ......... 398/83 |
| 2010/0008672 A1 * | | 1/2010 | Kovsh et al. ............ 398/85 |
| 2011/0200322 A1 * | | 8/2011 | Kovsh et al. ............ 398/2 |
| 2012/0177362 A1 * | | 7/2012 | Zhang et al. ............ 398/9 |

FOREIGN PATENT DOCUMENTS

| | | |
|---|---|---|
| WO | 199706614 | 2/1997 |
| WO | 2004030244 | 4/2004 |

OTHER PUBLICATIONS

International Search Report and Written Opinion dated Feb. 22, 2011 issued in related International Patent Application No. PCT/US2010/059352.

* cited by examiner

*Primary Examiner* — Daniel Washburn
*Assistant Examiner* — Hibret Woldekidan

(57) ABSTRACT

Channel power management may be achieved in a branched optical communication system such that uniform loading is provided across branch channels on a branch drop path without passing information signals that are not intended for the branch terminal to the branch drop path. In general, a system and method consistent with the present disclosure reuses one or more loading signals (e.g., noise bands) from the branch add path to maintain uniform loading in the branch drop path of the same branch. The system and method thus prevents trunk channels from being dropped to a branch terminal when those trunk channels are not intended for the branch terminal.

15 Claims, 3 Drawing Sheets

CHANNEL POWER MANAGEMENT IN A BRANCHED OPTICAL COMMUNICATION SYSTEM

TECHNICAL FIELD

The present disclosure relates to optical transmission systems, and in particular, to channel power management in a branched optical network.

BACKGROUND

To maximize the transmission capacity of an optical fiber transmission system, a single optical fiber may be used to carry multiple optical signals in what is called a wavelength division multiplexed system (hereinafter a WDM system). The multiple optical signals may be multiplexed to form a multiplexed signal or WDM signal with each of the multiple signals being modulated on separate wavelengths referred to as channels. Modern WDM systems have a high traffic capacity, for example, a capacity to carry 96 channels or more at 10 gigabits per second (hereinafter Gb/s) or more.

The optical fiber transmission system may include a relatively long trunk fiber segment that may be terminated at a transmitting and/or receiving trunk terminal. The optical fiber transmission system may further include one or more branching units situated along its trunk. Each branching unit (BU) may be connected to a branch fiber segment that terminates in a transmitting and/or receiving branch terminal. Each BU may include one or more optical add/drop multiplexers (OADM). Channels may be added to and/or dropped from the trunk fiber segment of the optical transmission system via the OADMs.

When information signals are transmitted over long distances, one or more amplifiers are provided to compensate for signal attenuation. The amplifiers used in some WDM systems (e.g., undersea systems) cannot easily be modified and are initially configured to support a fully loaded link (e.g., 96 channels, each channel carrying 10 Gb/s). In general, it may be desirable that the power per channel be sufficient to provide an adequate signal-to-noise ratio in the presence of the amplified spontaneous emission (ASE) noise from the amplifiers, necessitating a high amplifier total output power for systems with high fully-loaded capacity. The amplifiers may thus be configured to provide an optical output signal at a nominal total optical power.

The nominal amplifier output power level may be insensitive to the power at the input of the amplifier. As the amplifier input power varies over a wide range, the total amplifier output power may change very little around the nominal output power level. As additional channels are added, e.g. at a branching unit, the optical output power per channel may decrease. As channels are dropped, the optical output power per channel may increase.

Optical signals, while propagating through optical fibers, can experience nonlinear interaction. At sufficiently high values of optical power (e.g., more than 1 mW per channel), the optical signal may experience more distortion than at low optical powers (e.g., less than 1.0 mW per channel) which results in transmission penalty. Therefore, when channels are dropped, the value of optical channel power may increase, and network communication performance may suffer. Partial channel loading of a chain of optical amplifiers may result in undesirable noise accumulation in parts of the transmission band and gain reshaping effects that also degrade channel performance. In a partially loaded system, therefore, the transmission band may not be uniformly loaded with information signals and thus dummy tones or noise are added to control channel power along an optical path and provide uniform loading. Loading with dummy tones or noise may thus reduce nonlinear effects in optical fiber, avoid unnecessary gain tilt, avoid excessive noise accumulation, and avoid gain shaping effects such as Spectral Hole Burning (SHB).

Such uniform loading may occur in a branched optical communication system but adding and dropping of channels at the branching units presents unique challenges. Uniform loading may be maintained in the branch fiber segment if the signals carried on all of the trunk channels on a trunk fiber segment are passed on or dropped to the branch channels on a branch fiber segment and transmitted to a branch terminal. The signals carried on some of the trunk channels (also referred to as express channels), however, may not be intended for the branch terminal and should be prevented from reaching the branch terminal. On the other hand, if these signals are merely blocked or filtered out at the OADM branching unit, the transmission band in the branch segment may no longer be uniformly loaded and the channels carrying signals intended to be transmitted to the branch terminal will be penalized.

BRIEF DESCRIPTION OF THE DRAWINGS

Reference should be made to the following detailed description which should be read in conjunction with the following figures, wherein like numerals represent like parts.

DETAILED DESCRIPTION

Channel power management may be achieved in a branched optical communication system such that uniform loading is provided across branch channels on a branch drop path without passing information signals that are not intended for the branch terminal to the branch path. In general, a system and method consistent with the present disclosure reuses one or more loading signals (e.g., noise bands) from the branch add path of a branching unit to maintain uniform loading in the branch drop path of the same branching unit. The system and method thus maintains the uniform loading by reusing the loading signals from the branch path, thereby preventing trunk channels from being dropped to a branch terminal when those trunk channels are not intended for the branch terminal.

Figure 1:
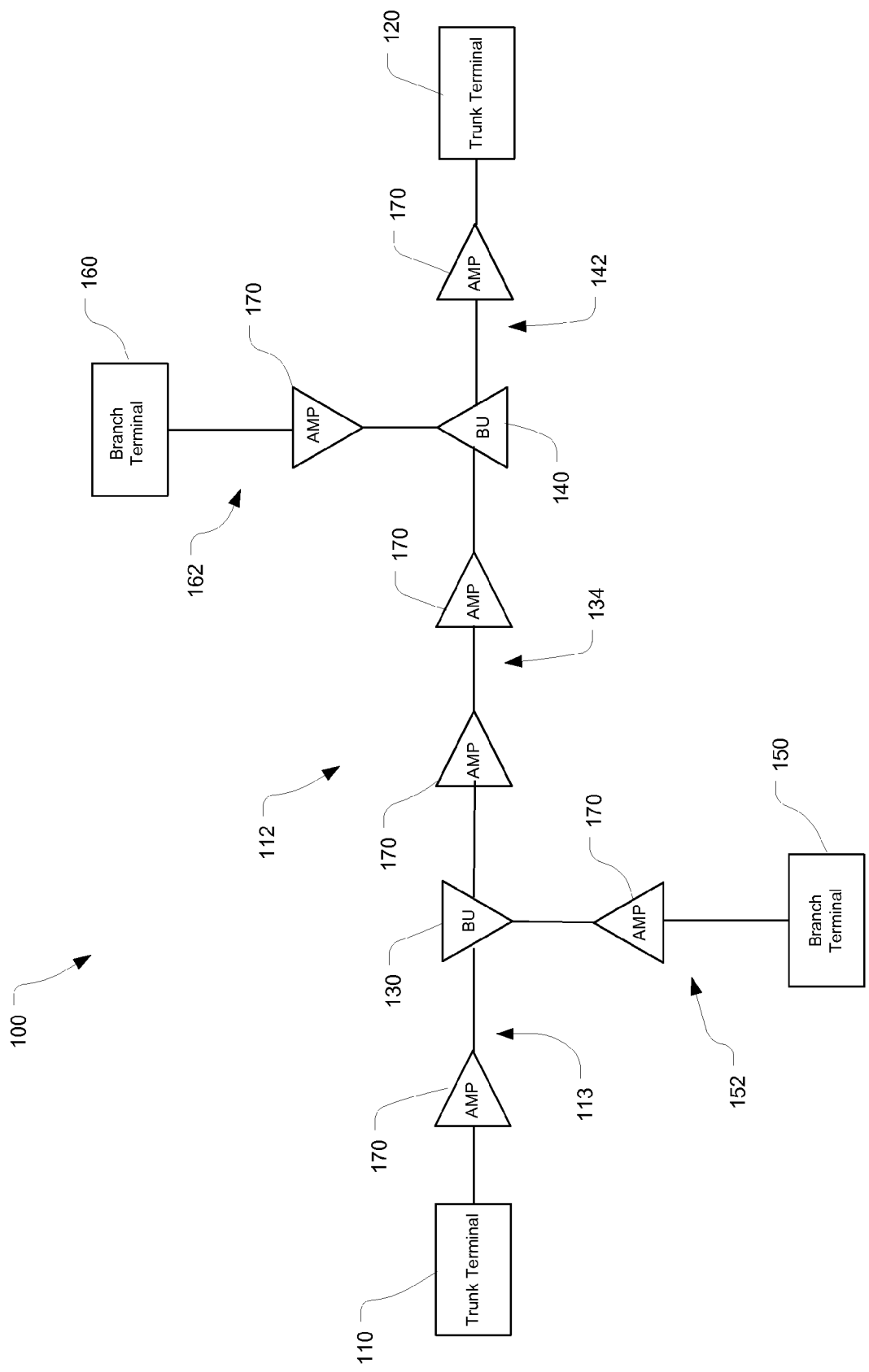
FIG. 1 is a schematic illustration of a branched optical communication system consistent with the present disclosure.

Turning now to FIG. 1, there is illustrated an exemplary branched optical communication system 100 in which channel power management may be implemented consistent with the present disclosure. Those skilled in the art will recognize that the system 100 has been depicted in highly simplified form for ease of explanation. The optical communication system 100 includes trunk terminals 110 and 120 coupled to a trunk path 112. The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The trunk path 112 may include a plurality of optical cable segments, e.g. cable segments 113, 134, 142, for carrying optical signals. Each cable segment may include one or more sections of optical fiber cable including optical fiber pairs and one or more repeaters 170 to provide a transmission path for bi-directional communication of optical signals between trunk terminal 110 and trunk terminal 120.

One or more branching units, e.g., branching units 130 and 140, may be coupled to the trunk path between the trunk terminals 110, 120. Each branching unit 130, 140 may be further coupled to a branch terminal, e.g., branch terminals 150 and 160, respectively, through an associated branch path 152, 162, respectively, perhaps through one or more repeaters 170 and linking optical cables. The system 100 may therefore be configured to provide bi-directional communication of optical signals between terminals 110, 120, 150 and/or 160 using the same trunk fiber pair, although multiple fiber pairs may be used and supported by each of the branching units 130, 140. For ease of explanation the description herein may refer to transmission from one terminal to another. It is to be understood, however, that the system 100 may be configured for bi-directional or uni-directional communication between any of the terminals 110, 120, 150 and/or 160.

The components in the trunk and branch paths may include known configurations for achieving their intended functionality. The repeaters 170, for example, may include any known optical amplifier/repeater configuration that compensates for signal attenuation on the transmission path. For example, one or more of the repeaters may be configured as an optical amplifier, such as an erbium doped fiber amplifier, a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal.

System 100 may be configured as a long-haul system, e.g. having a length between at least two of the terminals of more than about 600 km, and may span a body of water. When used to span a body of water, e.g. an ocean, amplifiers 170 and/or branching units 130 and/or 140 may be seated on the ocean floor and the trunk path 112 path may span between beach landings. It will be appreciated that a plurality of repeaters, branching units and optical media links may be disposed beneath water and/or over land.

The system 100 is a wavelength division multiplexed (WDM) system capable of transmitting, carrying and receiving a WDM signal including a plurality of multiplexed optical signals modulated on a plurality of different wavelengths referred to as channels. An optical information signal may originate at one or more of the trunk terminals and/or one or more of the branch terminals. Each branching unit 130, 140 may be configured to add and/or drop one or more information signals using, for example, an optical add/drop multiplexer (OADM). For example, a WDM signal that originates at trunk terminal 110 may include one or more information signals that occupy one or more of the channels on the trunk path 112 (i.e., trunk channels). Likewise, a WDM signal that originates at branch terminal 150 may also include one or more information signals that occupy one or more of the channels on the branch path 152 (i.e., branch channels). Both WDM signals may be transmitted to branching unit 130. Branching unit 130 may be configured to drop, i.e. extract, one or more information signals originating from the trunk terminal 110 and pass the dropped signals to the branch terminal 150. Branching unit 130 may be configured to add, i.e. insert, one or more information signals originating from branch terminal 150 to at least a portion of the WDM signal originating from the trunk terminal 110 and pass the resulting WDM optical signal, i.e. including the added information signals, onto segment 134. The resulting WDM optical signal may be received by branching unit 140. Branching unit 140 may similarly add and/or drop information signals. It will be appreciated that information signals that originate at terminal 120 and/or branch terminal 160 may be likewise added and/or dropped at branching unit 140 with a resulting optical signal transmitted to branching unit 130. Branching unit 130 may similarly add and/or drop information signals and pass a resulting optical signal to terminal 110.

Thus, a WDM signal transmitted along at least a portion of the trunk path 112 occupies a plurality of channels (i.e., trunk channels) and a WDM signal transmitted along the branch path, e.g., branch path 152 or 162, occupies a plurality of channels (i.e., branch channels). In a WDM system, a channel may be utilized or unutilized. As used herein, "utilized channels" refer to WDM system channel locations that contain information carrying signals and "unutilized channels" refer to WDM system channel locations that do not contain information carrying signals.

One or more of the utilized trunk channels (referred to as express channels) may pass through one or more of the branching units 130, 140 without being dropped, for example, carrying information signals from one trunk terminal 110 (origination) to the other trunk terminal 120 (destination). One or more of the utilized trunk channels (referred to as add/drop channels) may be added and/or dropped at one or more branching units 130, 140 and correspond in wavelength to one or more of the utilized branch channels (referred to as add/drop channels). Thus, an add/drop channel may extend between a trunk terminal 110 and a branch terminal 150 or between a branch terminal 150 and another branch terminal 150. Because the wavelength of a channel that is dropped at a branching unit is re-used when adding a channel at the branching unit, the add/drop channels may also be referred to as re-use channels.

In order to maintain uniform channel loading over the fiber optic network, unutilized channels may be loaded at trunk or branch terminals with loading signals. As used herein "loading signal" shall refer to a non-information carrying signal such as broadband noise, e.g. ASE noise, ASE noise band or a dummy tone. As used herein "dummy tones" shall refer to optical energy that is centered on a specific wavelength and that does not carry information or traffic. The branching units 130, 140 may be configured to drop only information signals that are intended for the respective branch terminals 150, 160; for example, express channels are not dropped at the branching units 130, 140. Because only a subset of the trunk channels are dropped/added at the branching units 130, 140, some of the branch channels on the branch paths 152, 162 are unutilized and the unutilized channels may be loaded with loading signals to provide uniform loading across the branch channels. The entire transmission band entering and exiting the branching units may, therefore, be uniformly loaded with either loading signals or information signals. In one embodiment, the loading signals may be loaded onto unutilized channels at about the same optical power as the information signals on the utilized channels. The loading signals may, therefore, draw a proportionate share of repeater power similar to the share drawn by the information signals, thereby avoiding the deleterious effects of transmitting unloaded parts of the band. As used herein, "uniform loading" does not necessarily require the same channel power on each of the channels in a transmission band.

Loading signals may be generated and added to unutilized channels at the trunk and branch terminals by methods known to those of ordinary skill in the art. In an embodiment where one or more loading signals are broadband noise, the noise may be generated and added to unutilized channels, for example, as disclosed in U.S. Patent Application Publication Number 2005/0286905 A1, entitled "Optical Fiber Transmission System with Noise Loading", published Dec. 29, 2005, the teachings of which are hereby fully incorporated herein by reference. For example, broadband noise may be generated by an amplifier and added to unutilized channels using appropriate filters and couplers. The amplifier, which may be a rare earth-doped fiber amplifier, may be configured to provide a substantially constant output power independent of input power. If the amplifiers inputs are unloaded or minimally loaded, the amplifier may generate ASE noise. The ASE noise may be added to WDM signals to be broadband, i.e. extending across the system bandwidth, and/or may be filtered resulting in ASE noise occupying one or more bands, sub-bands and/or channels within the system bandwidth. In an embodiment where one or more loading signals are dummy tones, the dummy tones may be generated, for example, by filtering noise, such as amplified spontaneous emission (ASE) noise, or by using a continuous-wave non-modulated laser source, as described for example in U.S. Patent Application Publication No. 2006/0051093 A1, entitled "System and Method for Spectral Loading an Optical Transmission System", published Mar. 9, 2006, the teachings of which are hereby fully incorporated herein by reference.

Figure 2A:
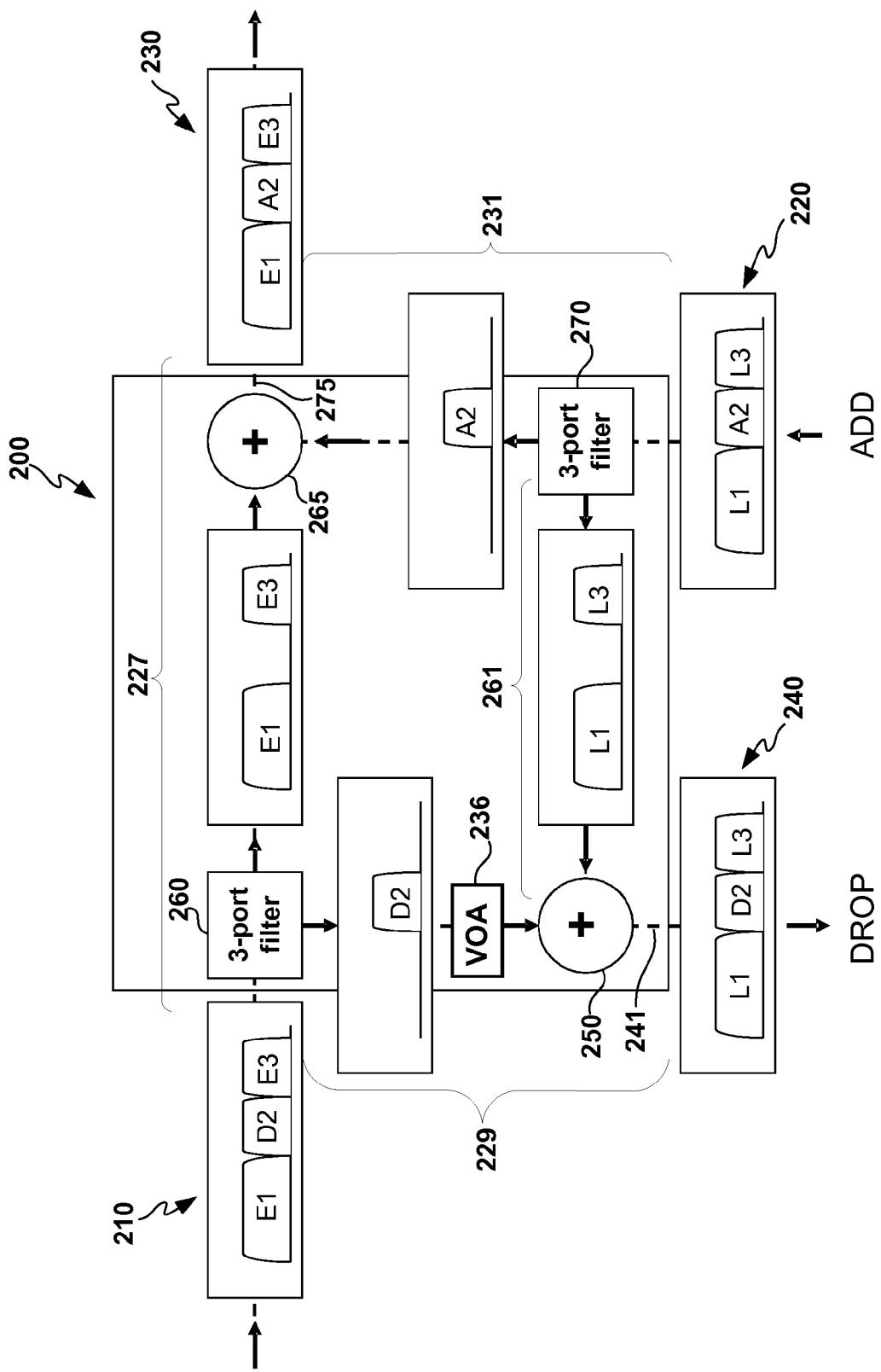
FIG. 2A is a schematic diagram of a branching unit, including pictorial illustrations of express, add, drop and loading channels, consistent with the present disclosure.
Figure 2B:
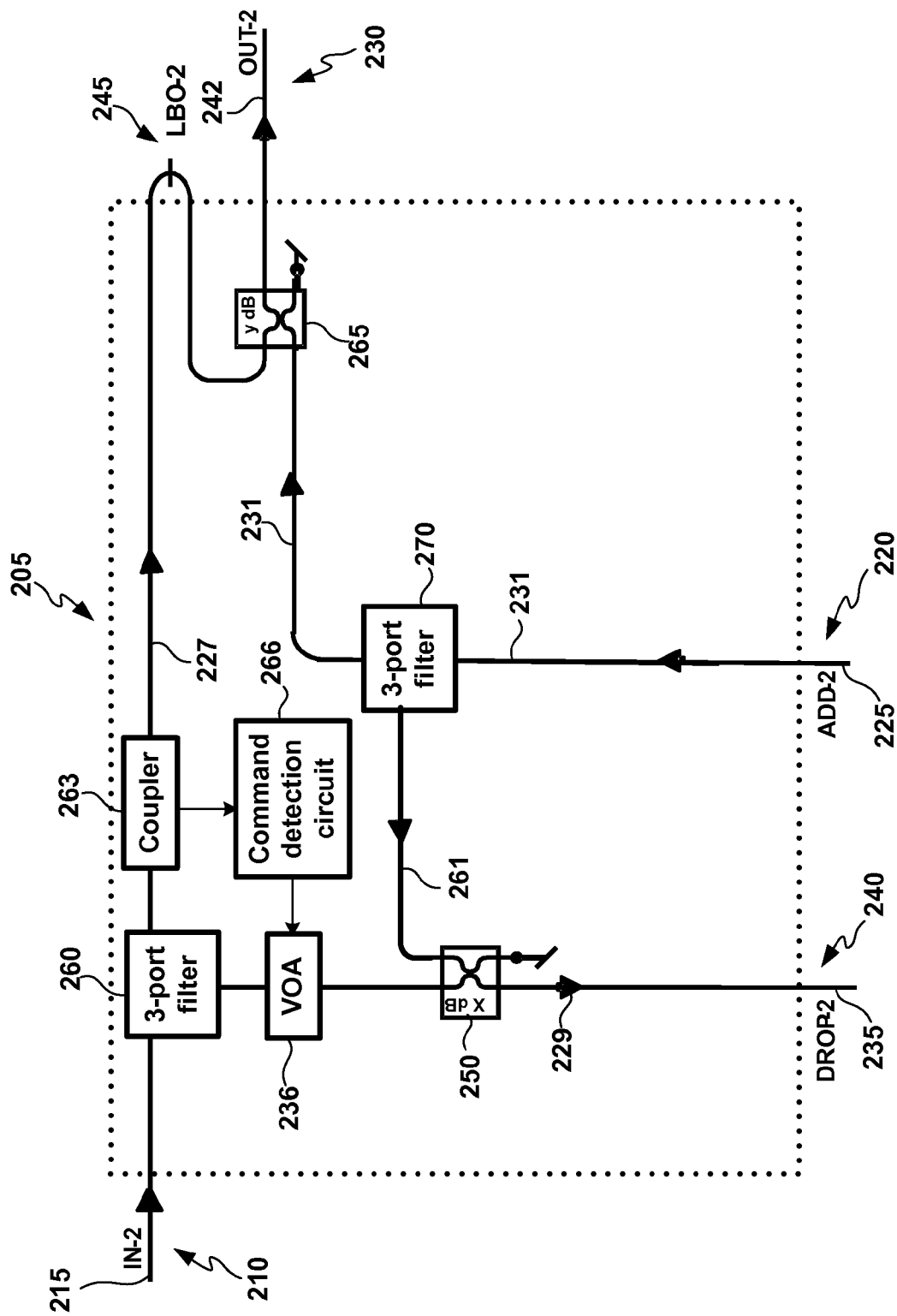
FIG. 2B is a schematic diagram of an OADM that may be useful in a branching unit consistent with the present disclosure.

One exemplary embodiment of a branching unit 200 useful in a system consistent with the present disclosure is diagrammatically illustrated in FIG. 2A. The branching unit 200 may correspond to branching unit 130 and/or branching unit 140 of FIG. 1. FIG. 2A includes schematic representations of the wavelength bands or sub-bands of at least some of the trunk channels and the branch channels. It will be appreciated by those of ordinary skill in the art that an actual optical spectra may include additional channels with additional wavelength bands or sub-bands. The spectra depicted in FIG. 2A are simplified for ease of explanation. FIG. 2B depicts an example of an OADM 205 that may be useful in a branching unit consistent with the present disclosure. The branching unit 200 and OADM 205 are configured to drop and add one or more channels to and from corresponding branch channels and for loading unutilized channels with loading signals.

For example, the branching unit 200 may be configured to receive a trunk WDM input signal 210 and a branch WDM input signal 220 and may be configured to output a trunk WDM output signal 230 and a branch WDM output signal 240. The trunk input signal 210 may be received from a trunk cable segment (e.g., cable segments 113, 134 or 142 shown in FIG. 1) and the branch input signal 220 may be received from (may originate at) a branch terminal (e.g., branch terminals 150 or 160 shown in FIG. 1). The trunk input signal 210 and the trunk output signal 230 may include a plurality of multiplexed optical signals carried on trunk channels such as one or more express channels and one or more add/drop channels carrying multiplexed information signals. The branch input signal 220 and branch output signal 240 may include a plurality of multiplexed optical signals carried on branch channels such as one or more add/drop channels carrying one or more information signals and one or more unutilized channels loaded with a loading signal. The illustrated trunk input signal 210 includes express channels E1, E3 and add/drop channel D2 and the illustrated branch input signal 220 includes add/drop channel A2 and unutilized channels L1, L3. Although the trunk input signal 210 is illustrated with two express channels E1, E3 and one add/drop channel D2, it will be appreciated that the trunk input signal 210 may include more or fewer express channels and/or more or fewer add/drop channels. Similarly, branch input signal 220 may include more or fewer more or fewer add/drop channels and/or more or fewer unutilized channels.

Branching unit 200 may include a plurality of filters. For example, a trunk filter 260 may be coupled to an express path 227 and may be configured to receive the trunk input signal 210. A branch filter 270 may be coupled to the add path 231 and may be configured to receive the branch input signal 220. The filters 260, 270 may be 3-port filters and may be configured to filter the respective input signal 210 or 220 into wavelength sub-bands and provide the sub-bands on separate paths. As used herein, "wavelength sub-band" refers to one or more wavelengths corresponding to one or more channels. For example, the trunk 3-port filter 260 filters wavelength sub-bands of the trunk channels into the sub-bands for express channels E1, E3 on the express path 227 and the sub-bands for add/drop channel D2 on the drop path 229. The exemplary branch 3-port filter 270 filters the wavelength sub-bands of the branch channels into the sub-bands for add/drop channel A2 on the add path 231 and the sub-bands for unutilized channels L1, L3 on a local path 261.

Branching unit 200 also includes a plurality of couplers for coupling respective signals from the filtered channels. A trunk optical coupler 265 couples information signals from the express channels E1, E3 with an information signal from the add channel A2 to produce a trunk optical coupler output signal 275. The resulting trunk output signal 230 includes information signals from the express channels E1, E3 and the add/drop channel A2. A branch optical coupler 250 couples loading signals from unutilized channels L1, L3 with an information signal from the add/drop channel D2 to produce a branch optical coupler output signal 241. The resulting branch output signal 240 includes the information signal from the add/drop channel D2 and the loading signals from the unutilized channels L1, L3.

The drop path 229 may include a variable optical attenuator (VOA) 236 coupled between the trunk filter 260 and the branch optical coupler 250. The VOA 236 may allow for selective attenuation or amplification of one or more wavelengths of add/drop channel D2. A command signal may be provided to the VOA 236 to set the VOA 236 to a desired amplification (or attenuation) level. The desired amplification (or attenuation) level of the VOA 236 may be used to adjust a relative power between information signal(s) from add/drop channel D2 and loading signals from unutilized channels L1, L3 to obtain and/or maintain uniform channel loading between the branching unit 200 and a branch terminal (e.g., branch terminal 150 or 160 shown in FIG. 1).

For example, the command signal may be sent from a terminal to the branching unit. As shown in FIG. 2B, for example, the command signal may be extracted from a trunk input signal 210 by a coupler 263. The extracted command signal may then be provided to a command detection circuit 266. The command detection circuit 266 may be coupled to the VOA 236 and the desired amplification (or attenuation) level may be set based on the command signal. A variety of configurations for the filters 260, 270, variable optical attenuator 236 and couplers 265, 250, 263 are known to those of ordinary skill in the art.

FIG. 2B depicts an example of an OADM 205 useful in a branching unit, e.g., branching unit 200. The OADM 205 may be configured for adding and/or dropping one or more optical signals. For example, the OADM 205 may be configured to receive a trunk input signal 210 at a trunk input port, e.g., trunk input port 215. The OADM 205 may be configured to receive a branch input signal 220 at a branch input port, e.g., branch input port 225. The OADM 205 may be configured to provide a trunk output signal 230 at a trunk output port, e.g., trunk output port 242, and a branch output signal 240 at a branch output port, e.g., branch output port 235.

The OADM 205 may include a plurality of filters 260, 270. For example, the OADM 205 may include a trunk input filter 260 coupled to the input port 215, an express path 227 and a drop path 229 and configured to receive the trunk input signal 210. The OADM 205 may include a branch input filter 270 coupled to the input port 225, an add path 231 and a local path 261 and configured to receive the branch input signal 220. The trunk input filter 260 and branch input filter 270 may be 3-port filters configured to filter the respective input signal 210 or 220 into wavelength sub-bands and provide the sub-bands on separate paths. For example, trunk input filter 260 may be configured to provide the wavelength sub-bands of express channels E1, E3 onto the express path 227 and the wavelength sub-bands of add/drop channel D2 onto the drop path 229 and the branch input filter 270 may be configured to provide the wavelength sub-bands of the unutilized channels L1, L3 onto the local path 261 and the wavelength sub-bands of the add/drop path A2 onto the add path 231.

The exemplary embodiment of the OADM 205 also includes a VOA 236. For example, the VOA 236 may be in the drop path 229 coupled between the trunk filter 260 and a branch optical coupler 250. The VOA 236 may allow for selective attenuation or amplification of one or more wavelengths of add/drop channel D2. A command signal may be provided to the VOA 236 to set the VOA 236 to a desired amplification (or attenuation) level. The desired amplification (or attenuation) level of the VOA 236 may be used to adjust a relative power between the information signal from add/drop channel D2 and the loading signals from unutilized channels L1, L3, to obtain and/or maintain uniform channel loading between the branching unit 200 and a branch terminal, e.g., branch terminal 150 or 160.

For example, the command signal may be sent from a terminal to a branching unit including the OADM 205. The command signal may be extracted from a trunk input signal 210 by a coupler 263. The extracted command signal may then be provided to a command detection circuit 266. The command detection circuit 266 may be coupled to the VOA 236 and the desired amplification (or attenuation) level may be set based on the command signal.

The OADM 205 may include a plurality of optical couplers. For example, the OADM 205 may include a branch optical coupler 250 coupled to the drop path 229 and the local path 261 and a trunk optical coupler 265 coupled to the express path 227 and the add path 231. The branch optical coupler 250 may be configured to couple loading signals from unutilized channels L1, L3 with an amplified or attenuated information signal from the add/drop channel D2 and to provide the coupled signal onto the drop path 229 to the branch output port 235. The trunk optical coupler 265 may be configured to couple information signals from express channels E1, E3 with an information signal from add/drop channel A2 and to provide the coupled signal onto the express path 227 to the trunk output port 242.

Each coupler 250, 265 may have a split ratio (e.g., x dB for a branching optical coupler and y dB for a combining optical coupler). For example, an optical coupler with a split ratio of 3 dB may correspond to substantially equal split of input power coupled into each branched output signal. In another example, an optical coupler with a 3 dB split ratio may correspond to a combined output signal including substantially equal power for each coupled input signal. The split ratios may be chosen to achieve nominal power values at outputs of the OADM 205. The trunk express path 227 may include a point loss element such as a line build out (LBO) 245. The point loss element 245 may be chosen to further adjust channel powers at the outputs of OADM 205. For example, the point loss element 245 may be configured to adjust for unequal transmission losses along a branch path 152, 162 and/or a portion of the trunk path 112. A variety of configurations for the filters 260, 270, variable optical attenuator 236 and couplers 265, 250, 263 are known to those of ordinary skill in the art.

In this manner, loading signals, e.g. from loaded unutilized channels L1, L3, in a branch input signal, received from a branch terminal, may be combined with an information signal from an add/drop channel from a trunk input signal, e.g., add/drop channel D2, for transmission to the branch terminal to maintain uniform channel loading between the branch terminal and the branching unit. Uniform channel loading between the OADM 205 and the branch terminal may be maintained, for example, by adjusting the relative channel powers using the VOA 236. Uniform channel loading between the branch terminal and the branching unit and/or OADM may be controlled at the branch terminal by, for example, adjusting transmitter parameters. Thus, the uniform channel loading may be accomplished without allowing channels, such as the express channels, from being dropped at the branching unit when those channels are not intended for the branch terminal coupled to that branching unit, thereby preserving security.

Although the OADM 205 is shown with ports and components for handling optical signals propagating in one direction, the OADM 205 may be bidirectional and may include similar functionality for signals propagating in the opposite direction. Although the illustrated exemplary embodiment shows the trunk input signal received on the input port 215, the branch input signal received on the input port 225, the trunk output signal provided to the output port 242 and the branch output signal provided to the output port 235, those of ordinary skill in the art will recognize that similar signals from the opposite direction may be received on and provided to corresponding input ports and output ports (not shown). The OADM 205 may also include corresponding 3-port filters coupled to the input ports to filter these signals and may include a VOA with coupler and command detection circuit (not shown) to provide amplification and attenuation as described above. Accordingly, the OADM 205 may be configured to add and drop channels bi-directionally.

According to one aspect of the present disclosure, a wavelength division multiplexed (WDM) optical system includes at least one trunk terminal configured to provide a WDM trunk input signal on a trunk path and at least one branch terminal configured to provide a WDM branch input signal on a branch add path. The trunk input signal occupies a plurality of trunk channels and the branch input signal occupies a plurality of branch channels. At least one of the branch channels is an unutilized channel loaded with a loading signal. The system also includes at least one branching unit coupled to the trunk path and the branch add path for receiving the trunk input signal and the branch input signal and providing a trunk output signal on the trunk path and a branch output signal on a branch drop path. The branching unit is configured to drop and add at least one of the trunk channels to and from corresponding ones of the branch channels on the branch drop path and the branch add path respectively. The corresponding ones of the trunk channels and the branch channels having corresponding wavelengths. The branching unit is configured to remove the loading signal from the unutilized channel on the branch add path and to load the loading signal on a corresponding unutilized channel on the branch drop path. The corresponding unutilized channels have corresponding wavelengths.

According to another aspect of the disclosure, an optical add/drop multiplexer includes a trunk input for receiving a WDM trunk input signal from a trunk path and a branch input for receiving a WDM branch input signal from a branch add path. The trunk input signal occupies a plurality of trunk channels and the branch input signal occupies a plurality of branch channels. At least one of the branch channels is an unutilized channel loaded with a loading signal. A trunk filter is coupled to the trunk input and is configured to filter the trunk channels of the trunk input signal into at least one add/drop channel and at least one express channel. A branch filter is coupled to the branch input and is configured to filter the branch channels of the branch input signal into at least one add channel and at least one unutilized channel. A trunk coupler is coupled to the trunk filter and the branch filter for coupling at least one information signal from the add channel with at least one information signal from the express channel to produce a WDM trunk output signal. A branch coupler is coupled to the branch filter and the trunk filter for coupling at least one information signal from the drop channel with the loading signal from the unutilized channel to produce a WDM branch output signal. A trunk output is coupled to the trunk coupler and provides the trunk output signal to the trunk path. A branch output is coupled to the branch coupler and provides the WDM branch output signal to a branch drop path.

According to yet another aspect of the disclosure, a method of maintaining loading of channels in a branched WDM optical network includes: transmitting a WDM trunk input signal on a trunk path, the trunk input signal occupying a plurality of trunk channels; transmitting a WDM branch input signal on a branch add path, the branch input signal occupying a plurality of branch channels, at least one of the branch channels being an unutilized channel loaded with a loading signal; receiving the trunk input signal and the branch input signal at a branching unit; dropping and adding at least one of the trunk channels to and from corresponding ones of the branch channels on a branch drop path and the branch add path respectively, the corresponding ones of the trunk channels and the branch channels having corresponding wavelengths; removing the loading signal from the unutilized channel on the branch add path; loading the loading signal on a corresponding unutilized channel on the branch drop path, the corresponding unutilized channels having corresponding wavelengths; and transmitting a WDM branch output signal on the branch drop path, the WDM branch output signal occupying the plurality of branch channels, at least one of the branch channels being the corresponding unutilized channel loaded with the loading signal removed from the unutilized channel on the branch add path.

The embodiments that have been described herein, however, are but some of the several which utilize this invention and are set forth here by way of illustration but not of limitation. Many other embodiments, which will be readily apparent to those skilled in the art, may be made without departing materially from the spirit and scope of the invention as defined in the appended claims.

What is claimed is:

1. A wavelength division multiplexed (WDM) optical system comprising:
    at least one trunk terminal configured to provide a WDM trunk input signal on a trunk path, said WDM trunk input signal occupying a plurality of trunk channels including at least one drop channel;
    at least one branch terminal configured to provide a WDM branch input signal on a branch add path, said WDM branch input signal occupying a plurality of branch channels including at least one add channel, at least one of said branch channels being an unutilized channel loaded with a loading signal;
    at least one branching unit coupled to said trunk path and said branch add path for receiving said trunk input signal and said branch input signal and providing a trunk output signal on said trunk path and a branch output signal on a branch drop path, wherein said branching unit is configured to drop said at least one drop channel and add said at least one add channel to and from corresponding ones of said branch channels on said branch drop path and said branch add path respectively, said corresponding ones of said trunk channels and said branch channels having corresponding wavelengths, and wherein said branching unit is configured to remove said loading signal from said unutilized channel on said branch add path and to couple said loading signal on a corresponding unutilized channel on said branch drop path with said at least one drop channel to produce said WDM branch output signal, said corresponding unutilized channels having corresponding wavelengths; and
    a variable optical attenuator (VOA) configured to selectively adjust said at least one drop channel in response to a command signal before said branching unit couples said loading signal on said branch drop path with said at least one drop channel.

2. A system according to claim 1, wherein said branching unit comprises:
    a trunk filter configured to filter said trunk channels of said WDM trunk input signal into said at least one drop channel and at least one express channel;
    a branch filter configured to filter said branch channels of said WDM branch input signal into said at least one add channel and at least one unutilized channel;
    a trunk coupler coupled to said trunk filter and said branch filter for coupling at least one information signal from said at least one add channel with at least one information signal from said at least one express channel to produce said WDM trunk output signal; and
    a branch coupler coupled to said branch filter and said trunk filter for coupling at least one information signal from said at least one drop channel with said loading signal from said at least one unutilized channel to produce said WDM branch output signal.

3. A system according to claim 1, wherein said trunk input signal comprises said command signal.

4. A system according to claim 1, further comprising a command signal detection circuit configured for receiving said command signal and providing an output representative of said command signal to said VOA.

5. A system according to claim 1, wherein said command signal is configured to amplify or attenuate said at least one drop channel relative to said loading signal from said at least one unutilized channel to maintain uniform loading in said branch output signal.

6. A system according to claim 1, wherein channel power is controlled across said branch channels by said branch terminal to maintain uniform loading in said branch input signal.

7. An optical add/drop multiplexer comprising:
   a trunk input for receiving a WDM trunk input signal from a trunk path, said WDM trunk input signal occupying a plurality of trunk channels;
   a branch input for receiving a WDM branch input signal from a branch add path, said WDM branch input signal occupying a plurality of branch channels, at least one of said branch channels being an unutilized channel loaded with a loading signal;
   a trunk filter coupled to said trunk input, said trunk filter configured to filter said trunk channels of said trunk input signal into at least one drop channel and at least one express channel;
   a branch filter coupled to said branch input, said branch filter configured to filter said branch channels of said branch input signal into at least one add channel and at least one unutilized channel;
   a trunk coupler coupled to said trunk filter and said branch filter for coupling at least one information signal from said at least one add channel with at least one information signal from said at least one express channel to produce a WDM trunk output signal;
   a branch coupler coupled to said branch filter and said trunk filter for coupling at least one information signal from said at least one drop channel with said loading signal from said at least one unutilized channel to produce a WDM branch output signal;
   a trunk output coupled to said trunk coupler, for providing said WDM trunk output signal to said trunk path;
   a branch output coupled to said branch coupler, for providing said WDM branch output signal to a branch drop path; and
   a variable optical attenuator (VOA) coupled between said trunk filter and said branch coupler and configured to selectively adjust said information signal from said at least one drop channel in response to a command signal before coupling said at least one information signal from said at least one drop channel with said loading signal from said at least one unutilized channel to produce said WDM branch output signal.

8. An optical add/drop multiplexer according to claim 7, wherein said trunk input signal comprises said command signal.

9. An optical add/drop multiplexer according to claim 7, further comprising
   a command signal detection circuit configured for receiving said command signal and providing an output representative of said command signal to said VOA.

10. An optical add/drop multiplexer according to claim 7, wherein said VOA is configured to adjust a power level of said information signal from at least one drop channel relative to said at least one loading signal to maintain uniform loading in said branch output signal.

11. An optical add/drop multiplexer according to claim 7, wherein channel power is controlled across said branch channels by said branch terminal to maintain uniform loading in said branch input signal.

12. A method of maintaining loading of channels in a branched WDM optical network comprising:
   transmitting a WDM trunk input signal on a trunk path, said WDM trunk input signal occupying plurality of trunk channels including at least one drop channel;
   transmitting a WDM branch input signal on a branch add path, said WDM branch input signal occupying a plurality of branch channels including at least one add channel, at least one of said branch channels being an unutilized channel loaded with a loading signal;
   receiving said WDM trunk input signal and said WDM branch input signal at a branching unit;
   dropping said at least one drop channel and adding said at least one add channel to and from corresponding ones of said branch channels on a branch drop path and said branch add path respectively, said corresponding ones of said trunk channels and said branch channels having corresponding wavelengths;
   removing said loading signal from said unutilized channel on said branch add path; and
   coupling said loading signal on a corresponding unutilized channel on said branch drop path with said at least one drop channel to produce a WDM branch output signal, said corresponding unutilized channels having corresponding wavelengths;
   transmitting said WDM branch output signal on said branch drop path, said WDM branch output signal occupying said plurality of branch channels, at least one of said branch channels being said corresponding unutilized channel loaded with said loading signal removed from said unutilized channel on said branch add path;
   receiving a command signal; and
   selectively attenuating or amplifying said at least one drop channel in response to said command signal before said coupling said loading signal with said at least one drop channel to produce said WDM branch output signal.

13. A method according to claim 12, wherein said WDM trunk input signal comprises said command signal.

14. A method according to claim 12, wherein said branching unit comprises a variable optical attenuator (VOA) and a command signal detection circuit configured for receiving said command signal and providing an output representative of said command signal to said VOA.

15. A method according to claim 12, wherein said selectively attenuating or amplifying said at least one drop channel is performed relative to said at least one loading signal to maintain uniform loading in said branch output signal.

* * * * *